United States Patent
Kunimoto

(10) Patent No.: US 10,203,687 B2
(45) Date of Patent: Feb. 12, 2019

(54) NUMERICAL CONTROL DEVICE

(71) Applicant: Mitsubishi Electric Corporation, Tokyo (JP)

(72) Inventor: Kazunori Kunimoto, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 57 days.

(21) Appl. No.: 15/515,866

(22) PCT Filed: Oct. 1, 2014

(86) PCT No.: PCT/JP2014/076267
§ 371 (c)(1),
(2) Date: Mar. 30, 2017

(87) PCT Pub. No.: WO2016/051555
PCT Pub. Date: Apr. 7, 2016

(65) Prior Publication Data
US 2017/0308053 A1   Oct. 26, 2017

(51) Int. Cl.
*G05B 19/404* (2006.01)

(52) U.S. Cl.
CPC .. *G05B 19/404* (2013.01); *G05B 2219/37506* (2013.01); *G05B 2219/41059* (2013.01);
(Continued)

(58) Field of Classification Search
None
See application file for complete search history.

(56) References Cited

U.S. PATENT DOCUMENTS

2009/0228138 A1   9/2009   Otsuki et al.

FOREIGN PATENT DOCUMENTS

| JP | 03-030002 A | 2/1991 |
| JP | 09-131681 A | 5/1997 |

(Continued)

OTHER PUBLICATIONS

International Search Report for PCT/JP2014/076267 dated Dec. 22, 2014 [PCT/ISA/210].
(Continued)

*Primary Examiner* — Sean Shechtman
(74) *Attorney, Agent, or Firm* — Sughrue Mion, PLLC; Richard C. Turner

(57) ABSTRACT

A numerical control device controlling a machine tool capable of machining on orthogonal three axes includes a parameter storage to store a noise-command allowable width to be used for determining whether to perform movement based on a movement command, and a path-correction processor to compare an absolute value of a movement amount according to a movement command in a command non-target axis direction that is a direction of an axis not included in a designated plane with the noise-command allowable width when a machining program block includes the movement command in the command non-target axis direction, determine the movement command in the command non-target axis direction to be a noise command when the absolute value of the movement amount according to the movement command in the command non-target axis direction is smaller, and perform path correction to set a movement amount according to the noise command to zero.

3 Claims, 6 Drawing Sheets

(52) U.S. Cl.
CPC ............ *G05B 2219/41194* (2013.01); *G05B 2219/49344* (2013.01); *Y02P 90/265* (2015.11)

(56) References Cited

FOREIGN PATENT DOCUMENTS

| | | | |
|---|---|---|---|
| JP | 3385247 | B2 | 3/2003 |
| JP | 3511583 | B2 | 3/2004 |
| JP | 3513100 | B2 | 3/2004 |
| JP | 2005-231028 | A | 9/2005 |
| JP | 2005-279926 | A | 10/2005 |
| JP | 4406034 | B2 | 1/2010 |

OTHER PUBLICATIONS

Written Opinion for PCT/JP2014/076267 dated Dec. 22, 2014 [PCT/ISA/237].
Notification of Reason for Refusal for JP Application No. 2015-531360 dated Sep. 28, 2015 (corresponding to PCT/JP2014/076267).
Decision to Grant a Patent for JP Application No. 2015-531360 dated Dec. 17, 2015 (corresponding to PCT/JP2014/076267).

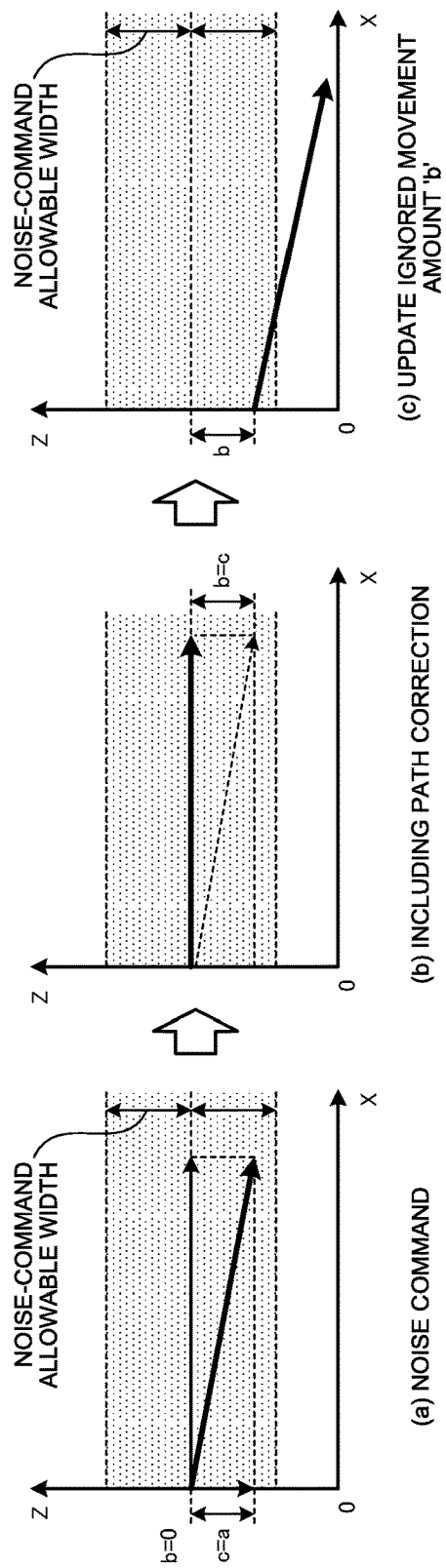

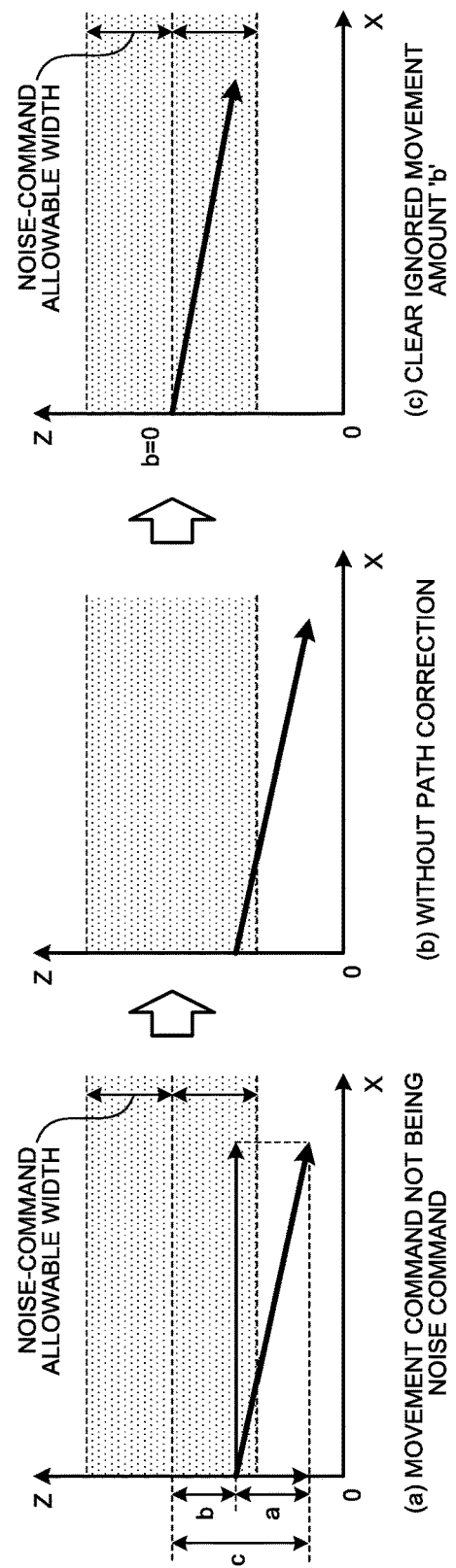

NUMERICAL CONTROL DEVICE

CROSS REFERENCE TO RELATED APPLICATIONS

This application is a National Stage of International Application No. PCT/JP2014/076267 filed Oct. 1, 2014, the contents of all of which are incorporated herein by reference in their entirety.

FIELD

The present invention relates to a numerical control device that controls a machine tool.

BACKGROUND

Conventionally, a numerical control (hereinafter, referred to as NC) device reads a machining program outputted from a CAD (Computer Aided Design) system or a CAM (Computer Aided Manufacturing) system, and controls an operation of a machine tool that machines a workpiece that is a machining object. Machining patterns for which the NC device controls a machine tool includes a pattern created by a contour machining process for machining a contour plane. In the contour machining, when a minute line segment program for a contour machining process is outputted from the CAD or CAM system, a minute movement command toward an axis other than a contour plane is sometimes erroneously outputted. The conventional NC device cannot determine whether the minute movement command is an erroneously outputted noise command, and thus outputs a noise command according to erroneous program to a drive unit of the machine tool.

The drive unit outputs a torque command to a motor for each axis according to a movement command, and moves a workpiece or the like with the motors to a designated position. One of functions of the drive unit is a lost motion compensation (hereinafter, referred to as LMC) function. The LMC function is a function of compensating a response delay caused by friction, distortion, expansion and contraction, backlash, or the like, occurring when a moving direction of a machine is inverted at a time when an orthant of the axis is changed. The drive unit can improve a protrusion phenomenon at the time of orthant change and a turning point at the time of orthant change in circular cutting by virtue of use of the LMC function.

Even if a movement command is a noise command, the drive unit having received the movement command from the NC device outputs a torque command including LMC when the direction of the noise command is inverted from a positive direction to a negative direction or from a negative direction to a positive direction. For this reason, when the amount of LMC for the noise command is excessive in the drive unit, a workpiece may be damaged. To prevent the drive unit from applying LMC, the NC device needs to read a program ahead and execute control to synchronize a timing when it is determined that minute invert occurs in the program and a timing when the drive unit applies the LMC, that is, control to issue a command for instructing the drive unit not to apply the LMC.

For example, Patent Literature 1 listed below discloses a technique of compensating a movement path to eliminate an adverse influence caused by a minute line segment of a program generated due to a calculation error of a CAM or the like. Patent Literature 2 listed below discloses a technique of switching between enablement and disablement of a process of decimating blocks from an NC program using an M code or a G code in numerical control for controlling a five-axis processing machine.

CITATION LIST

Patent Literatures

Patent Literature 1: Japanese Patent Application Laid-open No. 2001-125616
Patent Literature 2: Japanese Patent Application Laid-open No. 2009-217326

SUMMARY

Technical Problem

However, the conventional techniques mentioned above do not target a contour plane in orthogonal three-axis machining. Therefore, the techniques cannot realize control for targeting movement in a direction of an axis that is not included in a contour plane in the contour machining.

The present invention has been achieved in view of the above circumstances, and an object of the present invention is to provide a numerical control device that is capable of controlling an output of a movement command in a direction of an axis that is not included in a designated machining plane.

Solution to Problem

In order to solve the above-mentioned problems and achieve the object, the present invention provides a numerical control device controlling a machine tool capable of machining on orthogonal three axes, the numerical control device comprising: a parameter storage unit to store therein a noise-command allowable width to be used for determining whether to perform movement based on a movement command; and a path-correction processing unit to compare an absolute value of a movement amount according to a movement command in a command non-target axis direction that is a direction of an axis not included in a designated contour plane with the noise-command allowable width when a block of a machining program includes a movement command in the command non-target axis direction, determine the movement command in the command non-target axis direction to be a noise command when the absolute value of the movement amount according to the movement command in the command non-target axis direction is smaller than the noise-command allowable width, and perform path correction to set a movement amount according to the noise command to zero.

Advantageous Effects of Invention

According to the numerical control device of the present invention, an effect is obtained where it is possible to control an output of a movement command in a direction of an axis not included in a designated machining plane.

BRIEF DESCRIPTION OF DRAWINGS

FIG. 5 is a chart illustrating a noise command and a path after path correction.

FIG. 6 is a chart illustrating a movement command and a path for a case without path correction.

DESCRIPTION OF EMBODIMENTS

A numerical control device according to an embodiment of the present invention will be described in detail below with reference to the drawings. The present invention is not limited to the embodiment.

Embodiment

Figure 1:
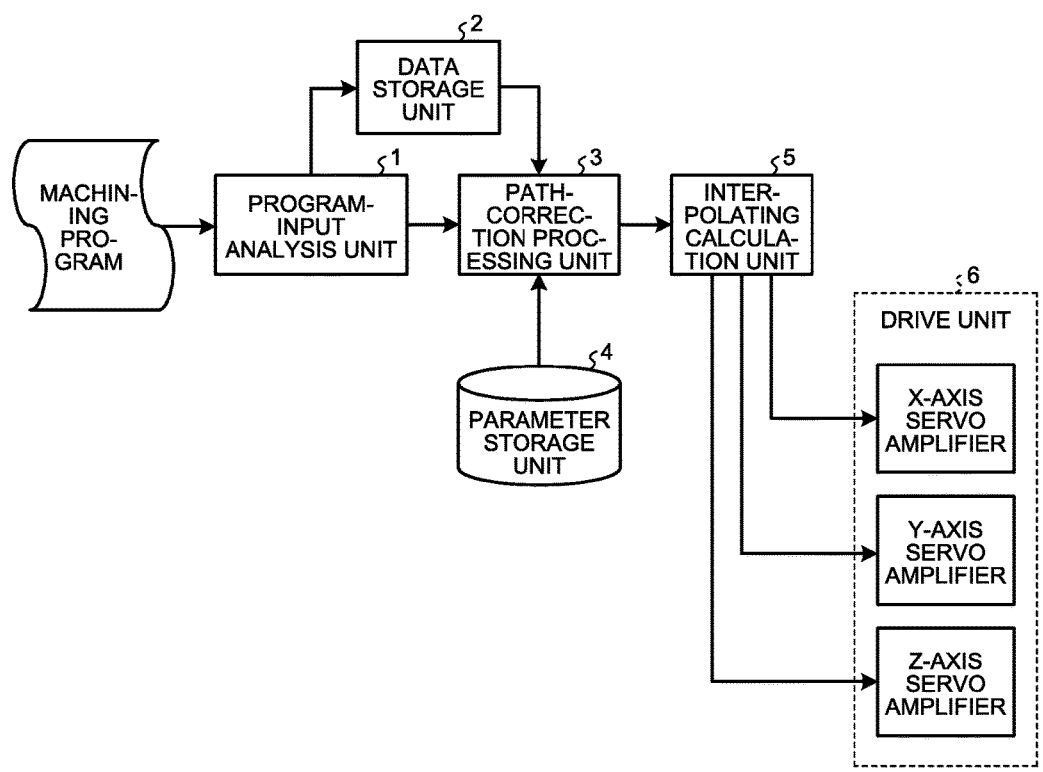
FIG. 1 is a block diagram illustrating an overall configuration of an NC device according to an embodiment of the present invention.

FIG. 1 is a block diagram illustrating an overall configuration of an NC device according to an embodiment of the present invention. The NC device is a numerical control device that controls an operation of a machine tool including a drive unit 6. In the present embodiment, a control target of the NC device is a machine tool that operates on orthogonal three axes including an X axis, a Y axis and a Z axis.

Figure 2:
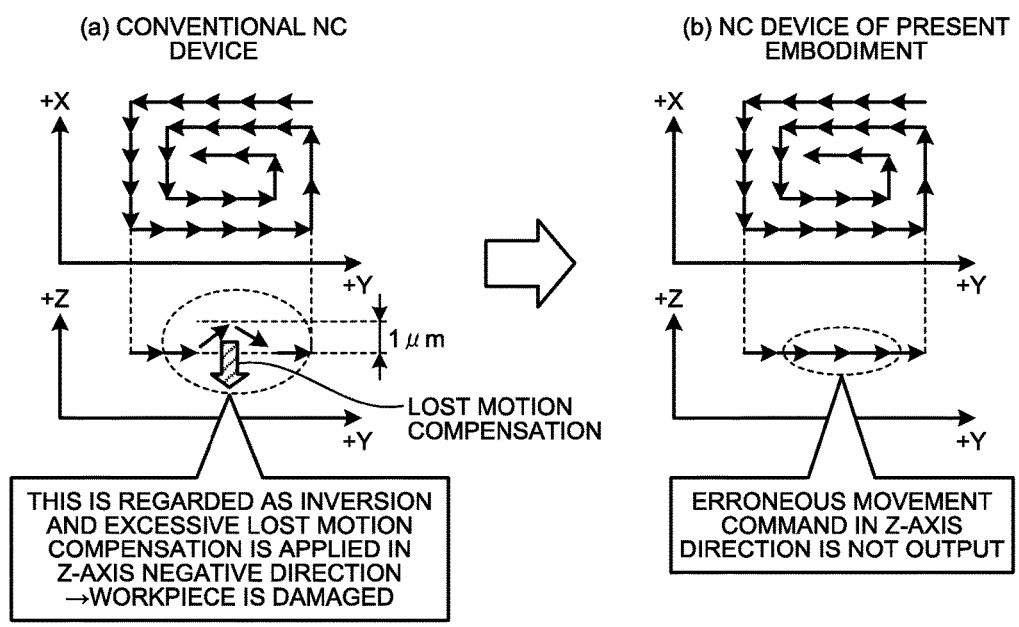
FIG. 2 is a chart illustrating machining patterns of NC devices in a contour machining mode.

An outline of a path correction process performed by the NC device of the present embodiment is described in comparison with a conventional technique. FIG. 2 is a chart illustrating machining patterns of the NC devices in a contour machining mode. FIG. 2(a) illustrates a machining pattern of a conventional NC device, and FIG. 2(b) illustrates a machining pattern of the NC device according to the present embodiment. In (a) and (b) of FIG. 2, a machining pattern in an X-Y plane is illustrated in an upper part, and the machining pattern in a Y-Z plane is illustrated in a lower part. In the conventional NC device, even when an erroneous movement command of about 1 μm or less in a Z-axis direction is included in a contour machining mode of the X-Y plane as illustrated in FIG. 2(a), the movement command is outputted as it is. Therefore, when the movement command in the Z-axis direction illustrated in FIG. 2(a) is regarded as an inversion and excessive LMC is applied in a negative direction of the Z axis, a workpiece may be damaged. In the NC device of the present embodiment, any erroneous movement command in the Z-axis direction is not outputted in the contour machining mode of the X-Y plane as illustrated in FIG. 2(b). Accordingly, application of excessive LMC can be avoided and a workpiece can be prevented from being damaged.

Referring back to FIG. 1, in the NC device, a program-input analysis unit 1 first reads a machining program inputted from a CAD or CAM system (not illustrated), and analyzes the machining program in units of blocks constituting the machining program, that is, block by block. After the analysis, the program-input analysis unit 1 stores data of a feeding speed per block, end point coordinates on the respective axes, and respective modal command flags in a data storage unit 2.

The data storage unit 2 is a storage unit in which the program-input analysis unit 1 saves data of the feeding speed, the end point coordinates on the respective axes, and the respective modal command flags for the analyzed block. While the data storage unit 2 is in form of an independent configuration in FIG. 1, the embodiment is not limited thereto. The data storage unit 2 may be provided as an inside component of the program-input analysis unit 1. A data table may be provided in the data storage unit 2 to store the data on the data table.

After one block of the machining program is analyzed in the program-input analysis unit 1, a path-correction processing unit 3 determines whether the analyzed block includes a noise command based on a noise-command allowable width stored in a parameter storage unit 4 in a case of the contour machining mode. When a noise command is included in the block, the path-correction processing unit 3 changes the end point coordinates and the feeding speed obtained in the program-input analysis unit 1 and saved in the data storage unit 2 in order to correct the path to a path in which a movement of the noise command is ignored.

The parameter storage unit 4 has stored therein the noise-command allowable width that is a parameter indicating the amount of movement for which a noise command is allowed with respect to a movement in a direction of an axis not included in a contour plane in the contour machining mode. The noise-command allowable width is a threshold to be used by the path-correction processing unit 3 for determining whether to perform movement based on a movement command. In the present embodiment, a movement command having a smaller movement amount than the noise-command allowable width is regarded as a noise command, and a movement command having a movement amount equal to or larger than the noise-command allowable width is not regarded as a noise command. A user sets the noise-command allowable width in advance before start of an operation of the NC device. The noise-command allowable width may be changed by a user through a display screen (not illustrated) of the NC device, and may be changed at the stage of a machining program.

An interpolating calculation unit 5 calculates a movement amount per unit time and a movement direction for each axis based on end point coordinates and a feeding speed designated by the program-input analysis unit 1 or the path-correction processing unit 3 regardless of whether or not path correction is performed by the path-correction processing unit 3, and outputs a movement command to the drive unit 6 of the machine tool including a servo amplifier for each of axes, the X, Y and Z axes. The drive unit 6 drives motors (not illustrated) of the respective axes based on the movement command. By doing so, the NC device can control the machine tool based on the read machining program.

A method of setting a contour machining mode for the NC device is described next. A user can create a machining program to be read by the NC device, and set the NC device to a contour machining mode according to a program command in the machining program. For example, four commands described below are registered in advance for parameters of the machining program as selected-plane notifying commands in respective contour machining modes and a cancellation notifying command for the contour machining modes. A number with M represents a command number of an M code that is a command for an auxiliary function to perform machining, and a content of a command to be executed is represented beside the command number of each M code.

M317 Contour machining mode (X-Y plane)
M318 Contour machining mode (Z-X plane)
M319 Contour machining mode (Y-Z plane)
M320 Contour machining mode cancellation In the above examples of commands, when instruction is made for any one of the contour machining modes M317, M318 and M319 by the machining program, the NC device is brought to the contour machining mode. The NC device in the contour machining mode turns on a path-correction request flag for a condition determination process to determine whether or not path correction is performed for a block including a movement command in a direction of an axis not included in a selected plane in the path-correction processing unit 3.

It is assumed here that an axis not included in a selected plane is a command non-target axis. A command non-target axis can be obtained in the NC device by registering which plane is selected by each of the M code commands of M317, M318 and M319 selecting the contour machining mode. In the above examples of commands, because the contour machining mode of M317 is a command for selecting the X-Y plane, the remaining Z axis is a command non-target axis not included in the selected plane. The contour machining mode of M318 is a command for selecting the Z-X plane and thus the remaining Y axis is a command non-target axis not included in the selected plane. Furthermore, the contour machining mode of M319 is a command for selecting the Y-Z plane and thus the remaining X axis is a command non-target axis not included in the selected plane.

Figure 3:
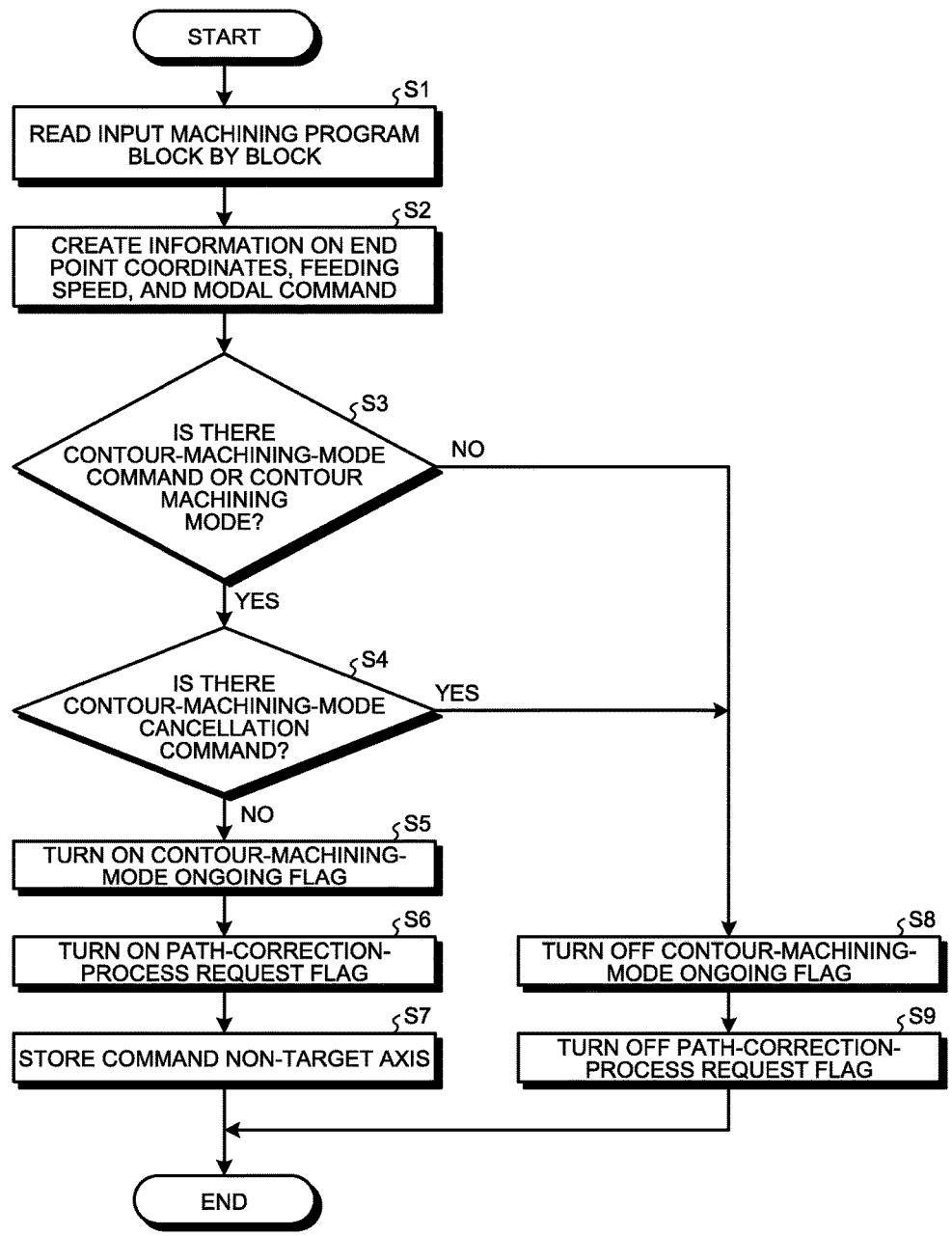
FIG. 3 is a flowchart illustrating an analysis process of a machining program in a program-input analysis unit.

A process of analyzing a machining program in the program-input analysis unit 1 is described next. FIG. 3 is a flowchart illustrating an analysis process of a machining program in the program-input analysis unit 1.

The program-input analysis unit 1 reads an inputted machining program block by block (Step S1), and creates information on end point coordinates, a feeding speed and a modal command for the read block of the machining program (Step S2). The end point coordinates are coordinates representing a target position of the read block after movement. The feeding speed is a moving speed up to the end point coordinates that is the target position. The modal command is a command that constantly designates one of a number of G codes, which are commands of a preparation function, in a group defined by the G codes, as an operation mode of the NC device. The NC device keeps the operation mode from when the modal command is issued until a cancellation command or another G code in the same group is issued.

Upon determining that a contour-machining-mode command is included in the read block or the contour machining mode is continuously active from the last block (YES at Step S3), the program-input analysis unit 1 then checks whether there is a contour-machining-mode cancellation command (Step S4). This process assumes a case where it is determined that the contour machining mode is continuously active from the last block. Upon determining that there is no contour-machining-mode cancellation command (NO at Step S4), the program-input analysis unit 1 turns on an a contour-machining-mode ongoing flag (Step S5), turns on a path-correction-process request flag (Step S6), stores a command non-target axis obtained from information of a selected plane designated by the current contour machining mode (Step S7), and ends the process.

Upon determining that there is no contour-machining-mode command in the read block and the contour machining mode is not active (NO at Step S3) or determining that there is a contour-machining-mode cancellation command while the contour machining mode is continuously active from the last block (YES at Step S4), the program-input analysis unit 1 turns off the contour-machining-mode ongoing flag (Step S8), turns off the path-correction-process request flag (Step S9), and ends the process.

The path correction process in the path-correction processing unit 3 is described next. When the path-correction-process request flag is on after one block of the machining program is analyzed, the program-input analysis unit 1 instructs the path-correction processing unit 3 to perform a path correction process. The path-correction processing unit 3 determines whether a movement command included in an analysis block that is a block analyzed by the program-input analysis unit 1 is a noise command. Upon determining that the movement command is a noise command, the path-correction processing unit 3 ignores a movement command in a direction of a command non-target axis not included in a contour plane, and recalculates the end point coordinates. When the path-correction-process request flag is off, the path-correction processing unit 3 may output the data saved in the data storage unit 2 as it is to the interpolating calculation unit 5 without performing the path correction process.

Figure 4:
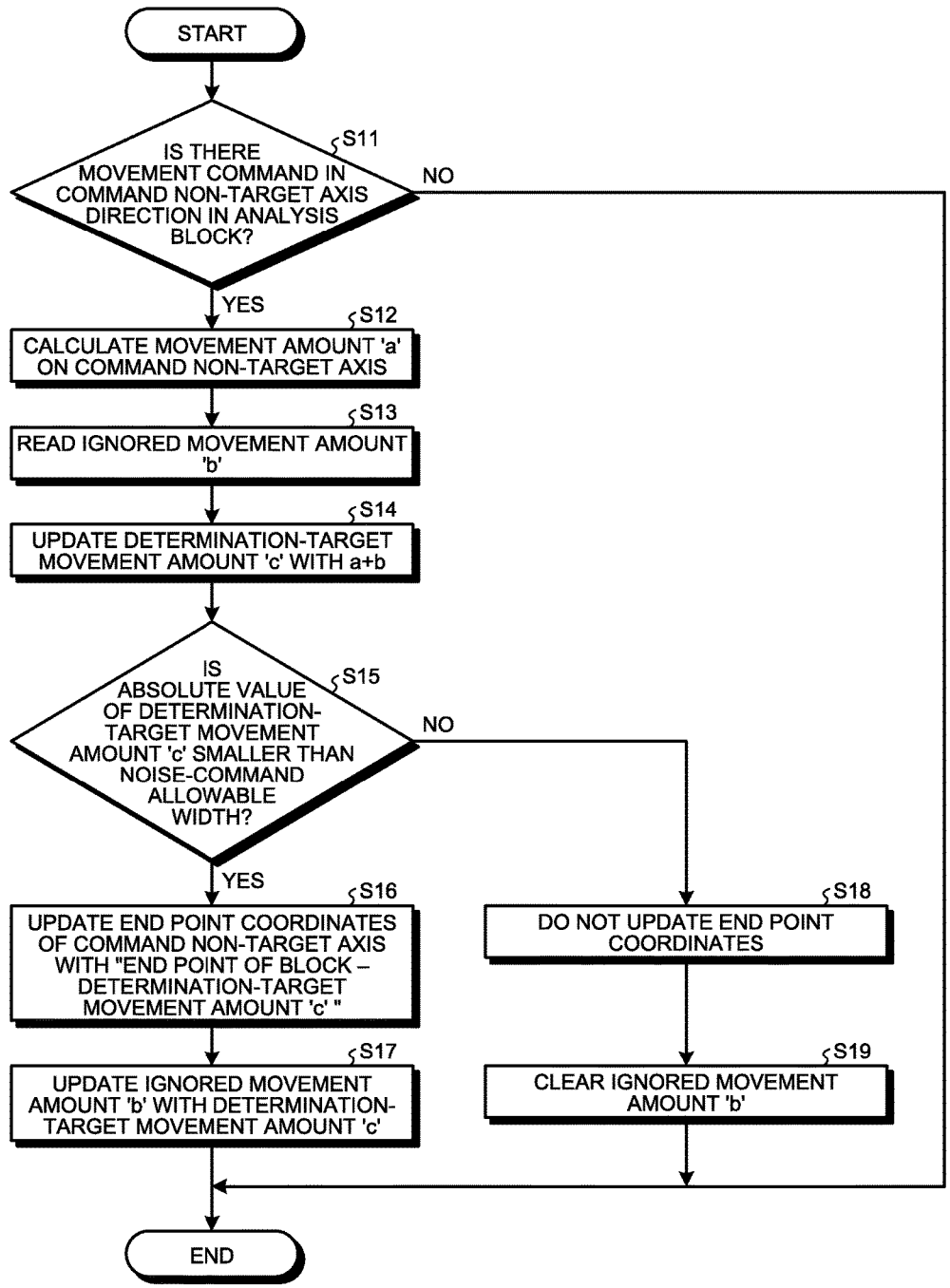
FIG. 4 is a flowchart illustrating a path correction process performed by a path-correction processing unit.

FIG. 4 is a flowchart illustrating the path correction process performed by the path-correction processing unit 3. The path-correction processing unit 3 checks whether a movement command in the command non-target axis direction is included in an analysis block (Step S11), and ends the process when no movement command in the command non-target axis direction is included in the analysis block (NO at Step S11).

When a movement command in the command non-target axis direction is included in the analysis block (YES at Step S11), the path-correction processing unit 3 reads the end point coordinates of the movement command in the command non-target axis direction in the analysis block, and calculates a movement amount 'a' from the current position on the command non-target axis (Step S12). It is assumed that the movement amount 'a' has a polarity of positive or negative.

The path-correction processing unit 3 reads an ignored movement amount 'b' retained in the past processes (Step S13). The ignored movement amount 'b' is a movement amount according to a movement command ignored in an analysis block that has been regarded to include a noise command, and means a difference between an actual movement command and the current position in the command non-target axis direction. That is, when the block has been regarded to include a noise command plural times, the ignored movement amount 'b' is a value obtained by cumulatively adding movement amounts according to ignored movement commands that is noise commands. At an initial path correction process or when path correction has not been performed until the last path correction process, the ignored movement amount 'b' is "0" (zero).

The path-correction processing unit 3 updates a determination-target movement amount 'c' that is to be compared with the noise-command allowable width stored in the parameter storage unit 4 with a value obtained by adding the movement amount 'a' and the ignored movement amount 'b' (Step S14).

The path-correction processing unit 3 compares the absolute value of the determination-target movement amount 'c' and the noise-command allowable width stored in the parameter storage unit 4 with each other. When the absolute value of the determination-target movement amount 'c' is smaller than the noise-command allowable width (YES at Step S15), the path-correction processing unit 3 regards the movement command in the command non-target axis direction in the analysis block as a noise command, and updates the end point coordinates on the command non-target axis with a result of calculation of "end point coordinates of analysis block—determination-target movement amount 'c'" (Step S16). By doing so, the path-correction processing unit 3 can ignore a noise command for the command non-target axis, that is, can remove a movement amount according to a noise command from the end point coordinates on the command non-target axis without changing the end point coordinates on the axes included in the contour plane.

The path-correction processing unit 3 updates the ignored movement amount 'b' with the determination-target movement amount 'c' in order to store the movement amount of the ignored noise command (Step S17), and ends the process. The updated ignored movement amount 'b' becomes the ignored movement amount 'b' to be read at Step S13 by the path-correction processing unit 3 at the time of the path correction process for the next and following blocks.

When the absolute value of the determination-target movement amount 'c' is equal to or larger than the noise-command allowable width (NO at Step S15), the path-correction processing unit 3 does not regard the movement command in the command non-target axis direction in the analysis block as a noise command, and does not update the end point coordinates (Step S18). In this case, the path-correction processing unit 3 clears the ignored movement amount 'b' (Step S19), that is, sets the ignored movement amount 'b' to "0" (zero), and ends the process.

After completion of the path correction process in the path-correction processing unit 3, the interpolating calculation unit 5 calculates a movement amount and a movement direction per unit time for each axis based on the end point coordinates and the feeding speed designated by the program-input analysis unit 1 or updated by the path-correction processing unit 3, and outputs a movement command to the drive unit 6. While the interpolating calculation unit 5 is outputting the movement command, the program-input analysis unit 1 performs analysis of the next block.

An outline of a path after a path correction process is performed is described with reference to FIGS. 5 and 6.

FIG. 5 is a chart illustrating a noise command, a path having path correction, and a state where an ignored movement amount 'b' is updated. The horizontal axes represent the movement amount in the X-axis direction, and the vertical axes represent the movement amount in the Z-axis direction to indicate a noise-command allowable in the Z axis. In FIG. 5(a), the ignored movement amount b=0. In this case, "determination-target movement amount 'c'=movement amount 'a'" is satisfied. Because the absolute value of the determination-target movement amount 'c' is smaller than the noise-command allowable width, the path-correction processing unit 3 determines that a movement command for the Z axis is a noise command in the act of G17 plane selection and in the act of a selected-plane notifying command for M317 (FIG. 5(a)), and accordingly performs path correction of ignoring a movement amount according to the noise command, that is, sets the movement amount in the Z-axis direction to "0" (zero) through the path correction (FIG. 5(b)). Furthermore, the path-correction processing unit 3 updates the ignored movement amount 'b' with the determination-target movement amount 'c', and uses the updated ignored movement amount 'b' in the path correction process for the next block (FIGS. 5(b), (c)).

FIG. 6 is a chart illustrating a movement command that is not a noise command, a path without path correction, and a state where an ignored movement amount 'b' is cleared. Because the ignored movement amount 'b' is not zero in FIG. 6(a), "determination-target movement amount 'c'=movement amount 'a'+ignored movement amount 'b'" is satisfied. Because the absolute value of the determination-target movement amount 'c' is equal to or larger than the noise-command allowable width, the path-correction processing unit 3 determines that a movement command in the Z-axis direction is a movement command that is not a noise command in the act of G17 plane selection and in the act of a selected-plane notifying command for M317 (FIG. 6(a)). Because the movement command in the Z-axis direction is not a noise command, the path-correction processing unit 3 sets the path based on the movement amount of the movement command in the Z-axis direction (FIG. 6(b)) without performing the path correction. Furthermore, the path-correction processing unit 3 clears the ignored movement amount 'b' to be set to "0" (zero), and uses the updated ignored movement amount b=0 in the path correction process for the next block (FIG. 6(c)).

As described above, according to the present embodiment, when a machining program designates a contour machining mode and a movement command in a direction of an axis other than one included in a designated contour plane is erroneously included in the machining program, the numerical control device that controls a machine tool regards the movement command in a direction of the axis other than one included in the contour plane as a noise command when the absolute value of a movement amount according to the movement command in a direction of the axis other than one included in the contour plane is smaller than a noise-command allowable width set by a parameter, and ignores the movement command that is the noise command in a direction of the axis other than one included in the contour plane and does not output that command to the drive unit 6. Accordingly, even when a contour-plane machining program created by CAD and CAM includes a noise command, the numerical control device can control an output of a movement command in a direction of an axis not included in a designated machining plane, and the drive unit 6 does not perform inappropriate LMC. Therefore, a workpiece machined surface is avoided from being damaged. Furthermore, man-hour of correcting noise blocks can be reduced.

In the present embodiment, the numerical control device compares the absolute value of a movement amount according to a movement command in a direction of an axis other than one included in a contour plane and a noise-command allowable width with each other. However, the present invention is not limited thereto. For example, the noise-command allowable width may have different allowable widths between a positive direction and a negative direction, and the numerical control device may determine that a movement command is a noise command when a movement amount according to the movement command in a direction of an axis other than one included in a contour plane is within an allowable range indicated by the positive and negative noise-command allowable widths.

While a case of contour machining to machine a contour plane has been described in the present embodiment, the present invention is not limited thereto. The present embodiment can be applied also to scanning-line machining to machine a scanning-line plane, for example.

In the present embodiment, the numerical control device is applied to a machine tool that operates a control target on orthogonal three axes of an X axis, a Y axis and a Z axis. However, this is merely one example, and the numerical control device can also be applied to a machine tool that operates it on three or more axes as long as machining can be realized on orthogonal three axes of an X axis, a Y axis, and a Z axis.

The configurations described in the embodiment are only an example of the contents of the present invention. The configurations can be combined with other publicly-known techniques, and a part thereof can be omitted or modified without departing from a scope of the invention.

REFERENCE SIGNS LIST

1 program-input analysis unit, 2 data storage unit, 3 path-correction processing unit, 4 parameter storage unit, 5 interpolating calculation unit, 6 drive unit.

The invention claimed is:

1. A numerical control device configured to control a machine tool to machine a workpiece, the numerical control device comprising:
   a parameter storage configured to store therein a noise-command allowable width to be used for determining whether to perform movement based on a movement command in a command non-target axis direction that is a direction of an axis not included in a designated plane; and
   a path-correction processor configured to compare an absolute value of a movement amount according to the movement command in the command non-target axis direction with the noise-command allowable width when a block of a machining program includes the movement command in the command non-target axis direction, determine the movement command in the command non-target axis direction to be a noise command when the absolute value of the movement amount according to the movement command in the command non-target axis direction is smaller than the noise-command allowable width, and perform path correction to set a movement amount according to the noise command to zero,
   wherein the path-correction processor is further configured to perform lost motion compensation (LMC) in response to determining that the movement command in the command non-axis target direction is not the noise command, to omit performing the LMC in response to determining that the movement command in the command non-axis target direction is the noise command, and to control the machine tool to machine the workpiece according to the path correction and the LMC.

2. The numerical control device according to claim 1, wherein
   the path-correction processor is configured to:
   store therein an ignored movement amount obtained by cumulatively adding movement amounts corresponding to previous noise commands to the movement amount of the noise command when the movement amount of the noise command is set to zero by the path correction, and
   when a target block of next and following blocks of the machining program includes a movement command in a command non-target axis direction, add a movement amount according to the movement command in the command non-target axis direction of the target block and the ignored movement amount to obtain a determination-target movement amount, compare an absolute value of the determination-target movement amount with the noise-command allowable width, determine the movement command in the command non-target axis direction in the target block to be a noise command when the absolute value of the determination-target movement amount is smaller than the noise-command allowable width, and perform path correction to set a movement amount according to the noise command of the target block to zero.

3. The numerical control device according to claim 2, wherein the path-correction processor is further configured to compare the absolute value of the determination-target movement amount with the noise-command allowable width, and set the ignored movement amount to zero when the absolute value of the determination-target movement amount is equal to or larger than the noise-command allowable width.

* * * * *